US012658691B2

(12) United States Patent
Hou et al.

(10) Patent No.: US 12,658,691 B2
(45) Date of Patent: Jun. 16, 2026

(54) SELF-ADAPTIVE PROTECTION CIRCUIT AND METHOD FOR DOUBLE-VOLTAGE STARTUP OF WIRELESS CHARGING SYSTEM

(71) Applicant: CHENGDU CONVENIENTPOWER SEMICONDUCTOR CO. LTD, Chengdu (CN)

(72) Inventors: Senlin Hou, Chengdu (CN); Jianping Wang, Chengdu (CN)

(73) Assignee: CHENGDU CONVENIENTPOWER SEMICONDUCTOR CO. LTD, Chengdu (CN)

( * ) Notice: Subject to any disclaimer, the term of this patent is extended or adjusted under 35 U.S.C. 154(b) by 751 days.

(21) Appl. No.: 18/003,628

(22) PCT Filed: May 13, 2022

(86) PCT No.: PCT/CN2022/092586

§ 371 (c)(1),
(2) Date: Dec. 28, 2022

(87) PCT Pub. No.: WO2023/115793

PCT Pub. Date: Jun. 29, 2023

(65) Prior Publication Data

US 2024/0039274 A1 Feb. 1, 2024

(30) Foreign Application Priority Data

Dec. 22, 2021 (CN) .......................... 202111578260.3

(51) Int. Cl.
| | |
|---|---|
| *H02J 50/10* | (2016.01) |
| *H02H 9/04* | (2006.01) |
| *H02J 7/64* | (2026.01) |

(52) U.S. Cl.
CPC ................. *H02H 9/04* (2013.01); *H02J 7/64* (2026.01); *H02J 50/10* (2016.02)

(58) Field of Classification Search
CPC ....................................................... H02J 50/10
(Continued)

(56) References Cited

U.S. PATENT DOCUMENTS

| | | | |
|---|---|---|---|
| 2015/0156846 A1 | 6/2015 | Cao | |
| 2018/0108308 A1* | 4/2018 | Cao | ...................... G09G 3/3696 |

FOREIGN PATENT DOCUMENTS

| | | | | |
|---|---|---|---|---|
| CN | 101145739 A | * | 3/2008 | .............. H02M 1/00 |
| CN | 105788560 A | | 7/2016 | |

(Continued)

*Primary Examiner* — Edward Tso
*Assistant Examiner* — Ahmed H Omar
(74) *Attorney, Agent, or Firm* — NKL Law; Allen Xue

(57) ABSTRACT

A self-adaptive protection circuit and method for double-voltage startup of a wireless charging system are provided. The method controls a double-voltage logic control module of a double-voltage starting circuit to send a signal for exiting a double-voltage mode by detecting an input voltage of a receiving terminal of the wireless charging system. By the input voltage of the receiving terminal of the wireless charging system, the double-voltage logic control module of the double-voltage starting circuit is controlled to send the signal for exiting the double-voltage mode, thus protecting the receiving terminal of the wireless charging system from the over-high input voltage in the double-voltage mode.

3 Claims, 3 Drawing Sheets

(58) Field of Classification Search
USPC ......................................................... 320/108
See application file for complete search history.

(56) References Cited

FOREIGN PATENT DOCUMENTS

| CN | 105915052 | A | 8/2016 | |
| CN | 112803563 | A | 5/2021 | |
| CN | 113162170 | * | 7/2021 | .............. H02J 50/12 |
| CN | 114447899 | A | 5/2022 | |

* cited by examiner

SELF-ADAPTIVE PROTECTION CIRCUIT AND METHOD FOR DOUBLE-VOLTAGE STARTUP OF WIRELESS CHARGING SYSTEM

CROSS REFERENCE TO RELATED APPLICATIONS

This application is a U.S. national stage entry of PCT International Application No. PCT/CN2022/092586, filed on May 13, 2022, which claims the priority of Chinese application No. 202111578260.3, entitled "Self-adaptive Protection Circuit and Method for Double-voltage Startup of Wireless Charging System", filed on Dec. 22, 2021, the contents of which is incorporated herein by reference in its entirety.

TECHNICAL FIELD

The present invention relates to the technical field of wireless charging, in particular to a self-adaptive protection circuit and method for double-voltage startup of a wireless charging system.

BACKGROUND

The charging current increases with the improvement of wireless charging power. In order to reduce the current loss caused by the coils, the coil with low inductance is selected to reduce the coil impedance, thus improving the through-current capability and achieving the purpose of increasing the power. However, the decreased coil inductance results in decreased coupling voltage and limited charge degrees of freedom. The poor coupling is not able to reach the voltage for normal starting the chips. In order to solve the problem of low-voltage startup with low-inductance coil, a double-voltage starting mode is adopted to ensure the normal startup of the chip. The double-voltage starting mode may solve the problem of low-voltage startup creates another. To be specific, in double-voltage mode, the input voltage (vrect) of the receiving terminal (RX) will be pulled up to a very high level by picking the receiving terminal up and putting it down quickly. As a result, the receiving terminal may be damaged.

SUMMARY

The present invention has for its object to provide a self-adaptive protection circuit and method for double-voltage startup of a wireless charging system to solve the problem that the input voltage of a receiving terminal is pulled up to a very high level when the receiving terminal is quickly picked up and put down during double-voltage startup of the wireless charging system, which leads to a risk of damaging the receiving terminal.

The present invention provides the self-adaptive protection method for double-voltage startup of the wireless charging system, which controls a double-voltage logic control module of a double-voltage starting circuit to send a signal for exiting a double-voltage mode by detecting an input voltage vrect of the receiving terminal of the wireless charging system.

Further, the self-adaptive protection circuit for double-voltage startup of the wireless charging system that realizes the method includes a clamping circuit 1, a clamping circuit 2, a clamping circuit 3, a resistor R1, a resistor R2, a resistor R3, a switching transistor NM1, a switching transistor NM2, a Schmitt trigger and a NOT gate;

the input voltage vrect of the receiving terminal of the wireless charging system is connected to a GND VSS through the clamping circuit 1, the clamping circuit 2, the clamping circuit 3, the resistor R1 and the resistor R2 in sequence; an electrical connection point located between the clamping circuit 1 and the clamping circuit 2 is connected to the drain of the switching transistor NM2; an electrical connection point located between the resistor R1 and the resistor R2 is connected to the source of the switching transistor NM2 and the gate of the switching transistor NM1; a source of the switching transistor NM1 is connected to the GND VSS; a drain of the switching transistor NM1 is connected to one end of the resistor R3 and an input end of the Schmitt trigger; the other end of the resistor R3 is connected to the Schmitt trigger and the power end of the NOT gate; an output end of the Schmitt trigger is connected to the double-voltage logic control module of the double-voltage starting circuit through the NOT gate; and an electrical connection point located between the double-voltage logic control module and the NOT gate is connected to the gate of the switching transistor NM2.

The operating method for the self-adaptive protection circuit for double-voltage startup of the wireless charging system includes the following steps:

after passing through the clamping circuit 1, the clamping circuit 2 and the clamping circuit 3, the input voltage vrect of the receiving terminal of the wireless charging system generates a switching control voltage vgate of the switching transistor NM1 at the gate thereof, and $vgate=(vrect-vc1-vc2-vc3)\times R2/(R1+R2)$; where, vc1 is a clamping voltage of the clamping circuit 1, vc2 is a clamping voltage of the clamping circuit 2, and vc3 is a clamping voltage of the clamping circuit 3; V0 is a low-voltage power supply generated by the input voltage vrect, which supplies power to the Schmitt trigger and the NOT gate, and the drain of the switching transistor NM1 is pulled up to the low-voltage power supply V0 by means of the resistor R3; the input end of the Schmitt trigger is set as the point A; when the input voltage vrect increases until the switching transistor NM1 is switched on at the switching control voltage vgate, the voltage at the point A is pulled down, an high-level output signal vrect_start_ov is generated through the Schmitt trigger and the NOT gate, and the high-level output signal vrect_start_ov is input into the double-voltage logic control module to control the double-voltage logic control module to send the signal for exiting the double-voltage mode;

when the high-level output signal vrect_start_ov is generated, the switching control voltage $vgate=vrect-vc1$, and when $vrect-vc1>V0-Vth2$, Vth2 is the threshold voltage of the switching transistor NM2, and the switching control voltage vgate is clamped to $V0-Vth2$; and with the decrease of the input voltage vrect, the switching control voltage vgate also decreases until the switching transistor NM1 is switched off, the voltage at the point A is pulled up to V0 by means of the resistor R3, and the output signal vrect_start_ov changes from high level to low level, thus controlling the double-voltage logic control module to send a signal for entering the double-voltage mode.

Therefore, the present invention provides the self-adaptive protection circuit for double-voltage startup of the wireless charging system, including the clamping circuit 1, the clamping circuit 2, the clamping circuit 3, the resistor R1, the resistor R2, the resistor R3, the switching transistor NM1, the switching transistor NM2, the Schmitt trigger and the NOT gate;

the input voltage vrect of the receiving terminal of the wireless charging system is connected to a GND VSS through the clamping circuit 1, the clamping circuit 2, the clamping circuit 3, the resistor R1 and the resistor R2 in sequence; an electrical connection point located between the clamping circuit 1 and the clamping circuit 2 is connected to the drain of the switching transistor NM2; an electrical connection point located between the resistor R1 and the resistor R2 is connected to the source of the switching transistor NM2 and the gate of the switching transistor NM1; a source of the switching transistor NM1 is connected to the GND VSS; a drain of the switching transistor NM1 is connected to one end of the resistor R3 and an input end of the Schmitt trigger; the other end of the resistor R3 is connected to the Schmitt trigger and the power end of the NOT gate; an output end of the Schmitt trigger is connected to the double-voltage logic control module of the double-voltage starting circuit through the NOT gate; and an electrical connection point located between the Schmitt trigger and the NOT gate is connected to the gate of the switching transistor NM2.

The present invention further provides the receiving terminal of the wireless charging system, including the double-voltage starting circuit and the self-adaptive protection circuit for double-voltage startup of the wireless charging system.

The present invention further provides the wireless charging system, including the transmitting terminal and the receiving terminal.

To sum up, after the above technical solution is used, the advantages of the present invention are as follows:

1. The present invention controls the double-voltage logic control module of the double-voltage starting circuit to send the signal for exiting the double-voltage mode by detecting the input voltage vrect of the receiving terminal of the wireless charging system, thus protecting the receiving terminal of the wireless charging system from the over-high input voltage vrect in the double-voltage mode.

2. The present invention may also automatically switch to the double-voltage mode when the input voltage vrect decreases.

3. The present invention has simple circuit, adjustable hysteresis, fast response and strong protection for the receiving terminal. Particularly, it has apparent protection effect in the scene of quick pick-up and put-down of the receiving terminal in the double-voltage mode.

BRIEF DESCRIPTION OF THE DRAWINGS

In order to illustrate the technical solutions in the embodiments of the present invention more clearly, figures in the embodiments will be introduced below briefly. It should be understood that the figures described below only show some embodiments of the present invention, and they shall not be construed as restrictions to the scope. Those of ordinary skill in the art may also obtain other figures on the basis of those figures without creative work.

DETAILED DESCRIPTION OF EMBODIMENTS

The technical solutions of the embodiments of the present invention will be described clearly and completely as follows in combination with the figures of these embodiments for a clear understanding of the purposes, technical solutions and advantages of the present invention. Apparently, the embodiments described are only some, not all of the embodiments of the present invention. Generally, the components in the embodiments of the present invention described and shown in the figures herein may be arranged and designed in various configurations.

Therefore, the detailed descriptions of the embodiments of the present invention provided in the figures are not intended to limit the scope of the present invention, and the embodiments are only certain embodiments of the present invention. All other embodiments obtained by those of ordinary skill in the art without creative work based on the embodiments of the present invention are within the scope of protection of the present invention.

Figure 1:
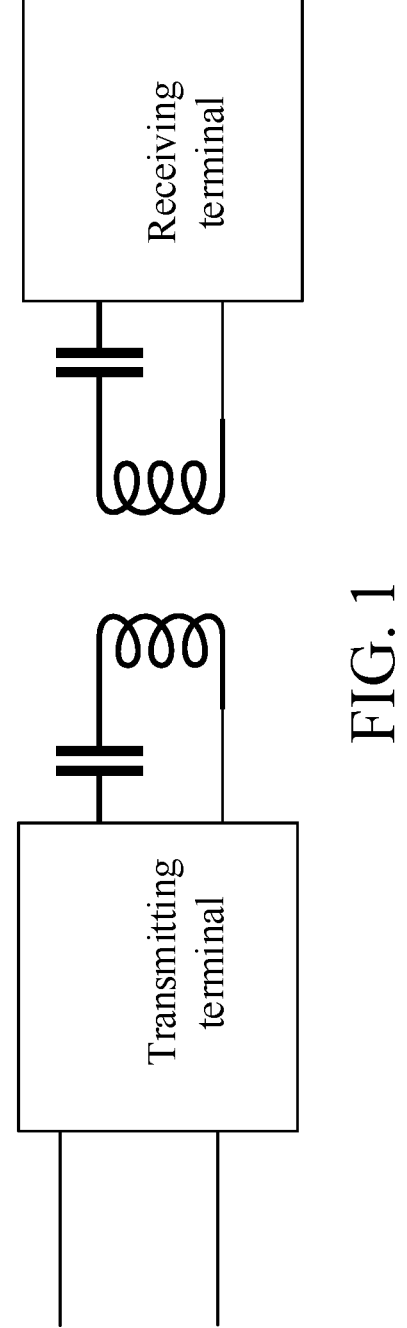
FIG. 1 is a structural diagram of the wireless charging system.

As shown in FIG. 1, a wireless charging system includes a transmitting terminal and a receiving terminal; The transmitting terminal and the receiving terminal transmit energy by a coil respectively. The two coils of the transmitting terminal and the receiving terminal approximately form a loosely coupled transformer, and the voltage of the receiving terminal depends on the voltage of the transmitting terminal, a coupling coefficient and inductance values of the coils of the transmitting terminal and the receiving terminal. In order to reduce the current loss caused by the coils, the coil with low inductance is selected to reduce the coil impedance, thus improving the through-current capability and achieving the purpose of increasing the power. However, the decreased coil inductance results in decreased coupling voltage and limited charge degrees of freedom. The poor coupling is not able to reach the voltage for normal starting the chips.

Figure 2:
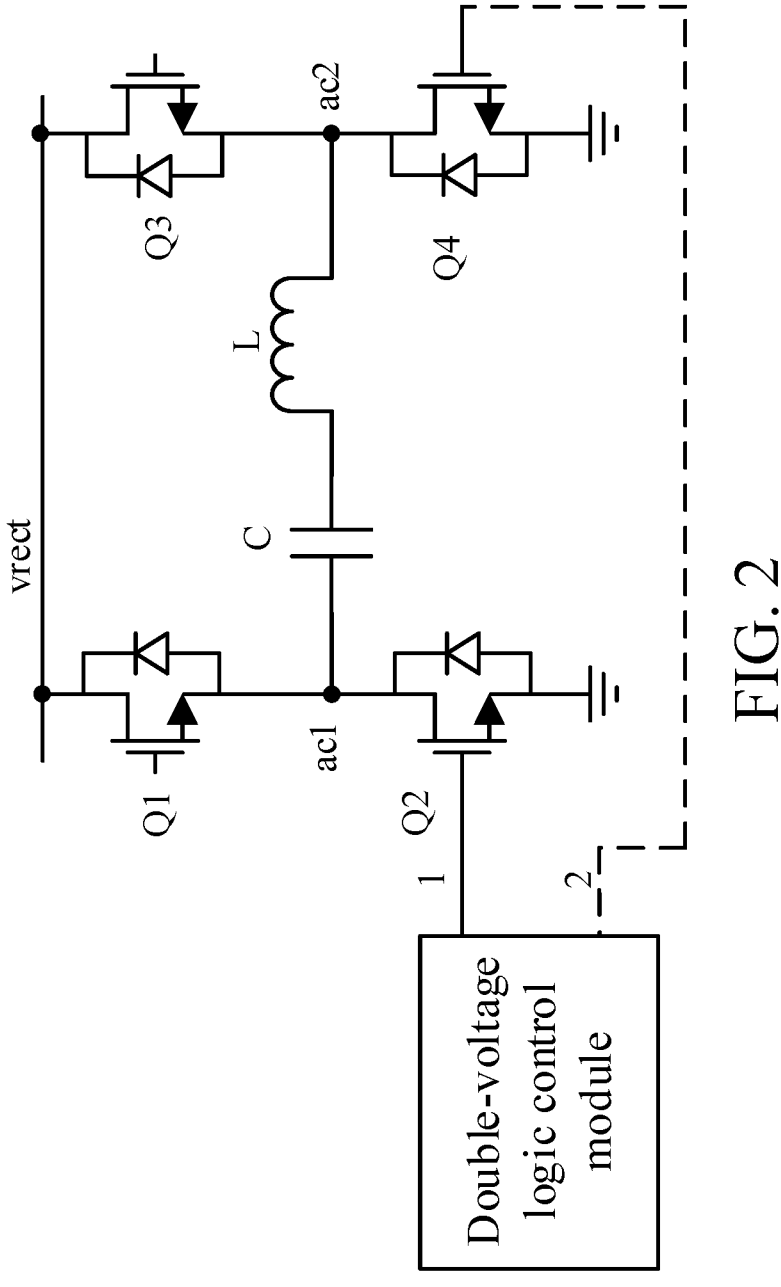
FIG. 2 is a structural diagram of the double-voltage starting circuit.

In order to solve the problem of low-voltage startup with low-inductance coil, the double-voltage starting circuit as shown in FIG. 2 is used to realize double-voltage startup and ensure normal startup of a chip. The double-voltage starting circuit includes a double-voltage logic control module, a switching transistor Q1, a switching transistor Q2, a switching transistor Q3, a switching transistor Q4, a capacitor C and an inductance L; the switching transistor Q1, the switching transistor Q2, the switching transistor Q3 and the switching transistor Q4 form a rectifier circuit SR; the double-voltage logic control module controls the switching transistor Q2 or Q4 to switch on all the time, thus allowing the rectifier circuit SR to work in the double-voltage mode; In the double-voltage mode, the input voltage vrect is twice as high as that in the full-bridge mode (the switching transistor Q2 and the switching transistor Q4 are alternately switched on). Therefore, the input voltage (vrect) of the receiving terminal is pulled up to a very high level when the receiving terminal (RX) is picked up and put down quickly, so there is a risk of damaging the receiving terminal.

Example 1

Figure 3:
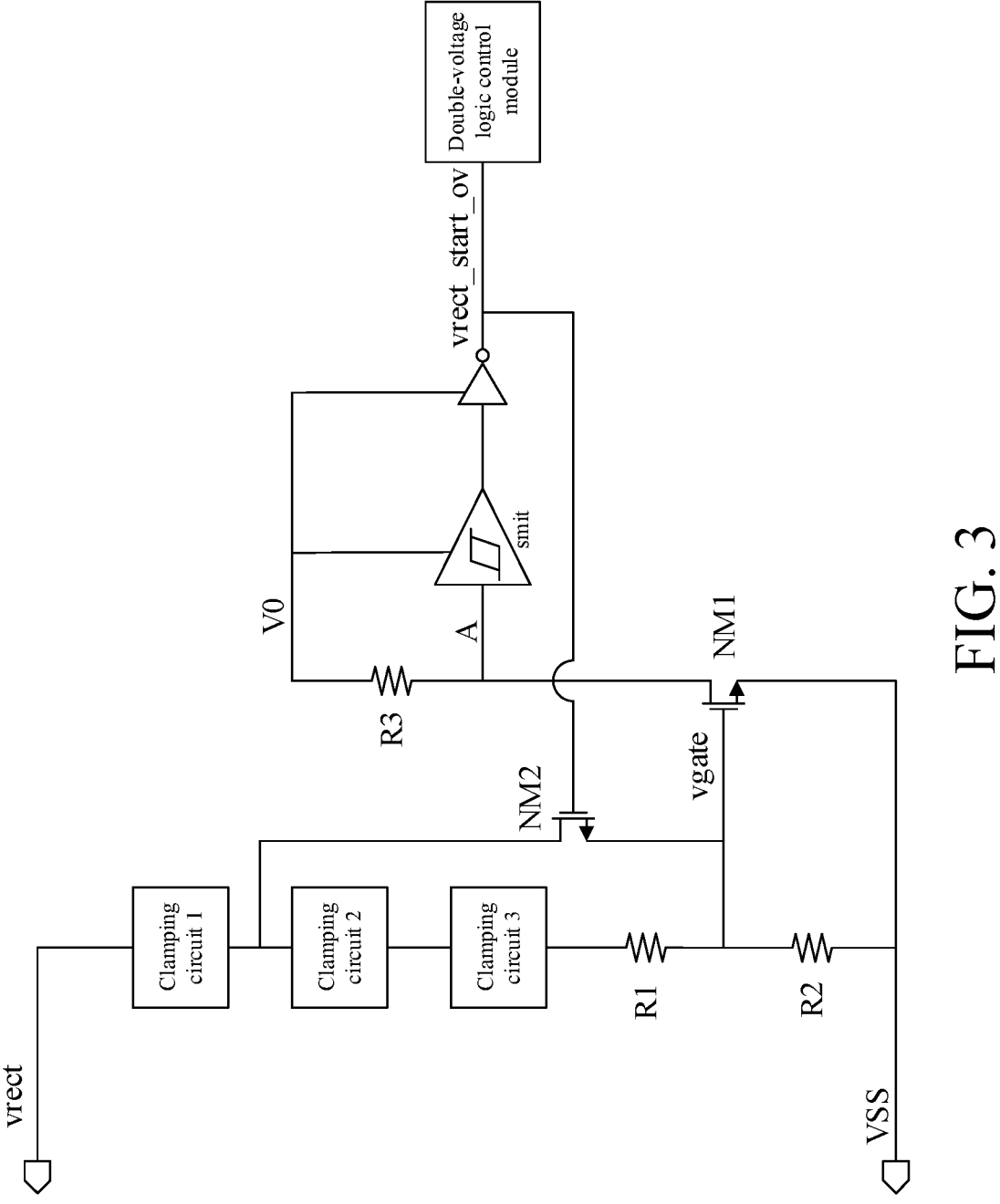
FIG. 3 is a structural diagram of the self-adaptive protection circuit for double-voltage startup of the wireless charging system according to an embodiment of the present invention.

To solve the above-mentioned problem, the embodiment sets forth a self-adaptive protection circuit and method for double-voltage startup of a wireless charging system. The method controls the double-voltage logic control module of the double-voltage starting circuit to send a signal for exiting the double-voltage mode by detecting the input voltage vrect of the receiving terminal of the wireless charging system. As shown in FIG. 3, to realize the method, the embodiment realize the self-adaptive protection circuit for double-voltage startup of the wireless charging system, which includes a clamping circuit 1, a clamping circuit 2, a clamping circuit 3, a resistor R1, a resistor R2, a resistor R3, a switching transistor NM1, a switching transistor NM2, a Schmitt trigger and a NOT gate.

the input voltage vrect of the receiving terminal of the wireless charging system is connected to a GND VSS through the clamping circuit 1, the clamping circuit 2, the clamping circuit 3, the resistor R1 and the resistor R2 in sequence; an electrical connection point located between the clamping circuit 1 and the clamping circuit 2 is connected to the drain of the switching transistor NM2; an electrical connection point located between the resistor R1 and the resistor R2 is connected to the source of the switching transistor NM2 and the gate of the switching transistor NM1; a source of the switching transistor NM1 is connected to the GND VSS; a drain of the switching transistor NM1 is connected to one end of the resistor R3 and an input end of the Schmitt trigger; the other end of the resistor R3 is connected to the Schmitt trigger and the power end of the NOT gate; an output end of the Schmitt trigger is connected to the double-voltage logic control module of the double-voltage starting circuit through the NOT gate; and an electrical connection point located between the double-voltage logic control module and the NOT gate is connected to the gate of the switching transistor NM2.

The operating method for the self-adaptive protection circuit for double-voltage startup of the wireless charging system includes the following steps:

after passing through the clamping circuit 1, the clamping circuit 2 and the clamping circuit 3, the input voltage vrect of the receiving terminal of the wireless charging system generates a switching control voltage vgate of the switching transistor NM1 at the gate thereof, and vgate=(vrect−vc1−vc2−vc3)×R2/(R1+R2); where, vc1 is a clamping voltage of the clamping circuit 1, vc2 is a clamping voltage of the clamping circuit 2, and vc3 is a clamping voltage of the clamping circuit 3; V0 is a low-voltage power supply generated by the input voltage vrect, which supplies power to the Schmitt trigger and the NOT gate, and the drain of the switching transistor NM1 is pulled up to the low-voltage power supply V0 by means of the resistor R3; the input end of the Schmitt trigger is set as the point A;

when the input voltage vrect increases until the switching transistor NM1 is switched on at the switching control voltage vgate, the voltage at the point A is pulled down, an high-level output signal vrect_start_ov is generated through the Schmitt trigger and the NOT gate, and the high-level output signal vrect_start_ov is input into the double-voltage logic control module to control the double-voltage logic control module to send the signal for exiting the double-voltage mode, thereby protecting the receiving terminal (RX) of the wireless charging system from the increasing input voltage vrect. when the high-level output signal vrect_start_ov is generated, the switching control voltage vgate=vrect−vc1, and when vrect−vc1>V0−Vth2, Vth2 is the threshold voltage of the switching transistor NM2, and the switching control voltage vgate is clamped to V0−Vth2; with the decrease of the input voltage vrect, the switching control voltage vgate also decreases until the switching transistor NM1 is switched off, the voltage at the point A is pulled up to V0 by means of the resistor R3, and the output signal vrect_start_ov changes from high level to low level, thus controlling the double-voltage logic control module to send a signal for entering the double-voltage mode, thus allowing the rectifier circuit SR to work in the double-voltage mode.

Example 2

According to the self-adaptive protection circuit for double-voltage startup of the wireless charging system in Example 1, the receiving terminal of the wireless charging system may also be realized, which includes the double-voltage starting circuit and the self-adaptive protection circuit for double-voltage startup of the wireless charging system in Example 1.

Example 3

According to the receiving terminal of the wireless charging system in Example 2, the wireless charging system may also be realized, which includes the transmitting terminal and the receiving terminal in Example 2.

Only preferred embodiments of the invention are described above, but not limited to the invention. For a person skilled in the art, the invention may take on various alterations and changes. Any modification, equivalent replacement and improvement made within the spirit and rule of the present invention shall be incorporated in the protection scope of the present invention.

The invention claimed is:
1. A self-adaptive protection method for switching on or off a double-voltage mode of a wireless charging system through a self-adaptive protective circuit, wherein:
the self-adaptive protection circuit comprises a first clamping circuit 1, a second clamping circuit 2, a third clamping circuit 3, a first resistor R1, a second resistor R2, a third resistor R3, a first switching transistor NM1, a second switching transistor NM2, a Schmitt trigger and a NOT gate;
an input voltage vrect of a receiving terminal of the wireless charging system is connected to a GND VSS through the first clamping circuit 1, the second clamping circuit 2, the third clamping circuit 3, R1, and R2 in sequence;
a drain of NM2 is connected to the first clamping circuit 1 and the second clamping circuit 2;
a source of NM2 and a gate of NM1 are connected to R1 and R2;
a source of NM1 is connected to the GND VSS, a drain of NM1 is connected to a first end of R3 and an input end of the Schmitt trigger;
a second end of R3 is connected to the Schmitt trigger and a power end of the NOT gate;
an output end of the Schmitt trigger is connected to a double-voltage logic control module through the NOT gate; and
a gate of NM2 is connected to the double-voltage logic control module and the NOT gate,
the method comprising:
inputting an input voltage vrect to the self-adaptive protection circuit the first clamping circuit 1, whereby:

generating a switching control voltage vgate NM1, R1, R2, wherein vgate=(vrect−vc1−vc2−vc3)×R2/(R1+R2), vc1, vc2, vc3 being clamping voltages of the first clamping circuit 1, the second clamping circuit 2, and the third clamping circuit 3, respectively;

generating a low-voltage power supply V0 as a power supply to the Schmitt trigger and the NOT gate and pulling up a voltage at the drain of NM1 through the resistor R3 to set a reference voltage at the input end of the Schmitt trigger;

when the input voltage vrect increases until NM1 is switched on at the switching control voltage vgate, pulling down the refence voltage at the input end of the Schmitt trigger, and generating an output signal vrect_start_ov above a preset threshold level through the Schmitt trigger and the NOT gate as an input into the double-voltage logic control module to cause the double-voltage logic control module to exit the double-voltage mode;

when the output signal vrect_start_ov is generated, the switching control voltage vgate=vrect−vc1, and when vrect−vc1>V0−Vth2, Vth2 being a threshold voltage of the switching transistor NM2, and the switching control voltage vgate is clamped to V0−Vth2; and when the input voltage vrect decreases, the switching control voltage vgate decreases until the switching transistor NM1 is switched off, pulling up the reference voltage at the input end to the Schmitt trigger to V0 by means of the resistor R3, and reducing the output signal vrect_start_ov to below the preset threshold level, thus causing the double-voltage logic control module to enter the double-voltage mode.

2. A receiving terminal of a wireless charging system, comprising a double-voltage starting circuit and a self-adaptive protection circuit, wherein:

the self-adaptive protection circuit comprises a first clamping circuit 1, a second clamping circuit 2, a third clamping circuit 3, a first resistor R1, a second resistor R2, a third resistor R3, a first switching transistor NM1, a second switching transistor NM2, a Schmitt trigger and a NOT gate;

an input voltage vrect of a receiving terminal of the wireless charging system is connected to a GND VSS through the first clamping circuit 1, the second clamping circuit 2, the third clamping circuit 3, R1, and R2 in sequence;

a drain of NM2 is connected to the first clamping circuit 1 and the second clamping circuit 2;

a source of NM2 and a gate of NM1 are connected to R1 and R2;

a source of NM1 is connected to the GND VSS, a drain of NM1 is connected to a first end of R3 and an input end of the Schmitt trigger;

a second end of R3 is connected to the Schmitt trigger and a power end of the NOT gate;

an output end of the Schmitt trigger is connected to a double-voltage logic control module through the NOT gate; and a gate of NM2 is connected to the double-voltage logic control module and the NOT gate.

3. A wireless charging system, comprising a transmitting terminal and the receiving terminal according to claim 2.

* * * * *